(12) United States Patent
Hanson et al.

(10) Patent No.: US 11,052,592 B2
(45) Date of Patent: Jul. 6, 2021

(54) EXTRUDER ASSEMBLY AND METHOD OF EXTRUDING A MELTABLE MATERIAL USING THE EXTRUDER ASSEMBLY

(71) Applicant: Processing Technologies International, LLC, Aurora, IL (US)

(72) Inventors: Dana R. Hanson, St. Charles, IL (US); Ryan E. Leopold, Aurora, IL (US)

(73) Assignee: Processing Technologies International, LLC, Aurora, IL (US)

( * ) Notice: Subject to any disclaimer, the term of this patent is extended or adjusted under 35 U.S.C. 154(b) by 325 days.

(21) Appl. No.: 15/948,118

(22) Filed: Apr. 9, 2018

(65) Prior Publication Data

US 2019/0308355 A1 Oct. 10, 2019

(51) Int. Cl.
*B29C 48/265* (2019.01)
*B29C 48/355* (2019.01)
*B29C 48/25* (2019.01)

(52) U.S. Cl.
CPC ........ *B29C 48/265* (2019.02); *B29C 48/2522* (2019.02); *B29C 48/2526* (2019.02); *B29C 48/2665* (2019.02); *B29C 48/355* (2019.02); *B29C 48/2563* (2019.02)

(58) Field of Classification Search
CPC ...... B29C 48/2526; B29C 2948/92952; B29C 48/00; B29C 2948/92704; B29C 48/832; B29C 48/92; B29C 46/252
See application file for complete search history.

(56) References Cited

U.S. PATENT DOCUMENTS

2016/0090458 A1* 3/2016 Lindenfelzer ....... B29C 44/3484
428/220

2018/0236705 A1* 8/2018 Conrad ................... B29C 45/47

FOREIGN PATENT DOCUMENTS

DE    102012008170    * 10/2013 ............. B29C 47/08
JP    WO2016167326    * 10/2016 ............. B29C 47/40

OTHER PUBLICATIONS

DE-102012008170 Rust Translation (Year: 2013).*
John DeGaspari, "The right extruder motor is key to maximizing uptime", Nov. 23, 2015 https://www.plasticsmachinerymagazine.com/blow-molding/article/13000929 (Year: 2015).*
"Air-cooled engine", Wikipedia, Dec. 7, 2016 Wayback Machine Screenshot https://en.wikipedia.org/wiki/Air-cooled_engine (Year: 2016).*
WO2016167326 Sawa Translation (Year: 2016).*

* cited by examiner

*Primary Examiner* — Jacob T Minskey
*Assistant Examiner* — Adrien J Bernard
(74) *Attorney, Agent, or Firm* — Wood, Phillips, Katz, Clark & Mortimer

(57) ABSTRACT

An extruder assembly has a frame with upstream and downstream ends. A barrel assembly on the frame has a passage. At least one material advancing component resides at least partially within the passage and is configured to be turned around an operating axis to thereby cause material to be conveyed from a passage inlet to a passage outlet. A drive assembly turns the at least one material advancing component around its operating axis and has a motor on the frame situated so that at least a part of the motor is in lengthwise overlapping relationship with the barrel assembly. The drive assembly is configured to turn the one material advancing component around its operating axis at a speed of at least 300 rpm.

19 Claims, 6 Drawing Sheets

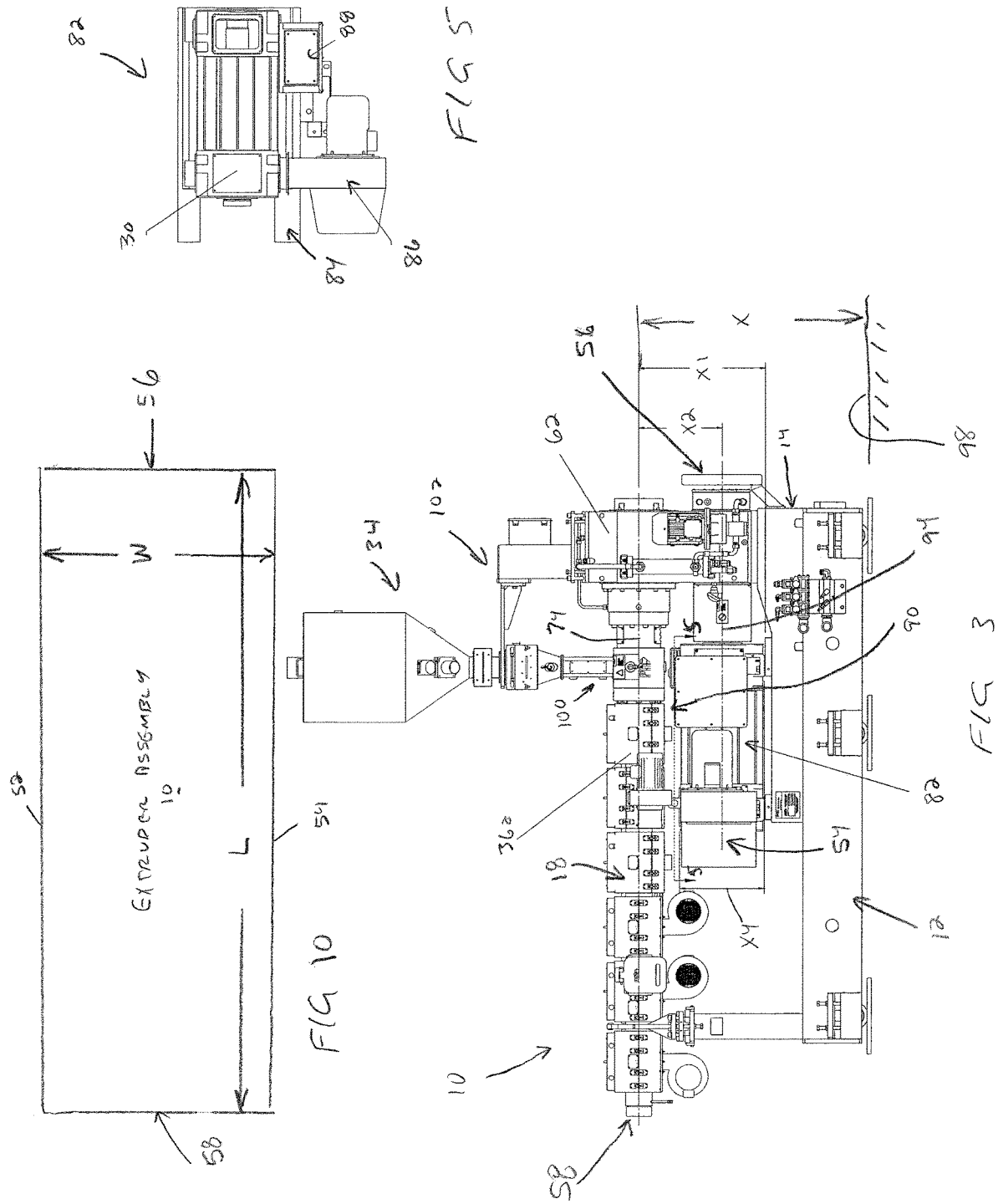

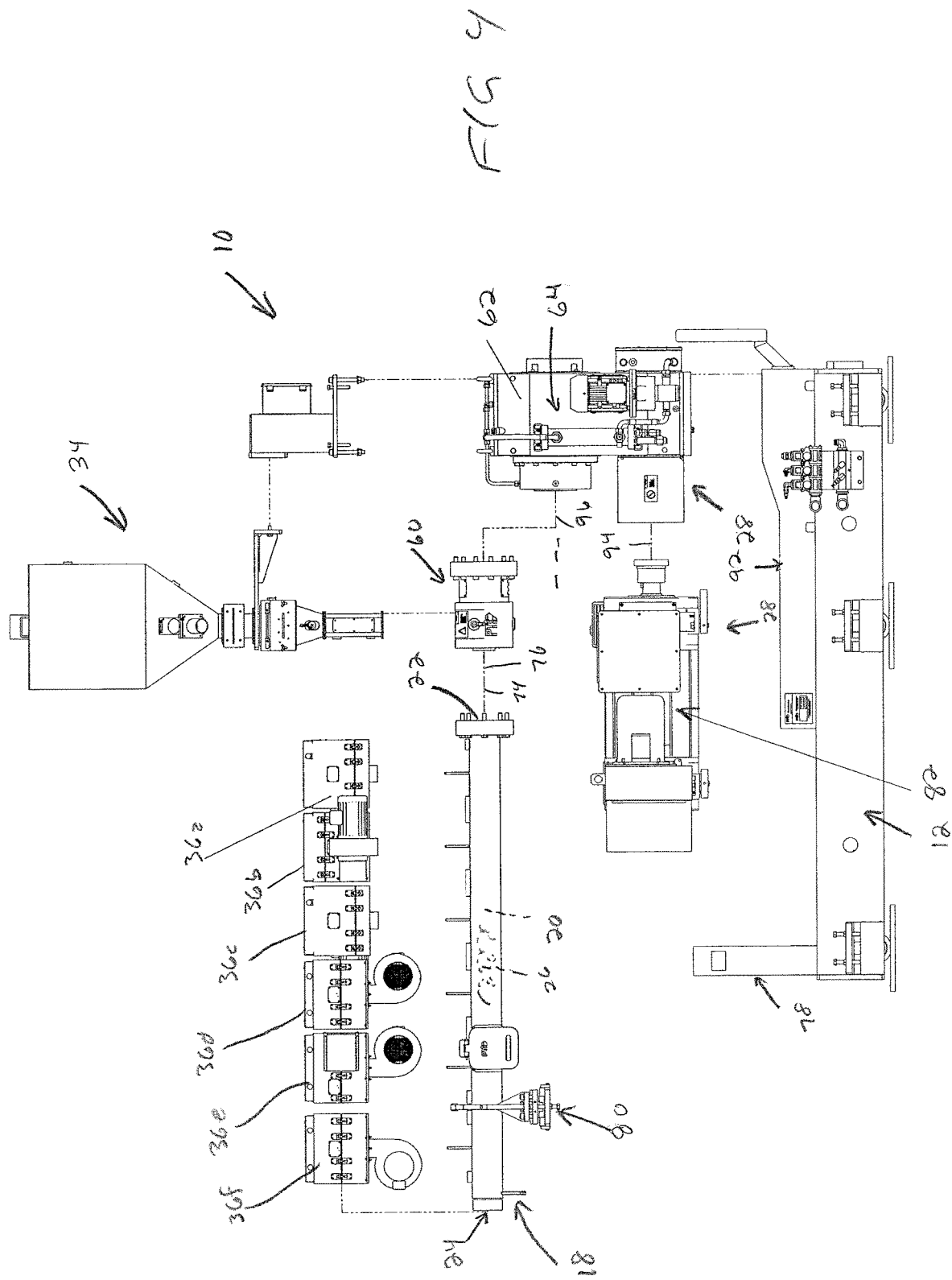

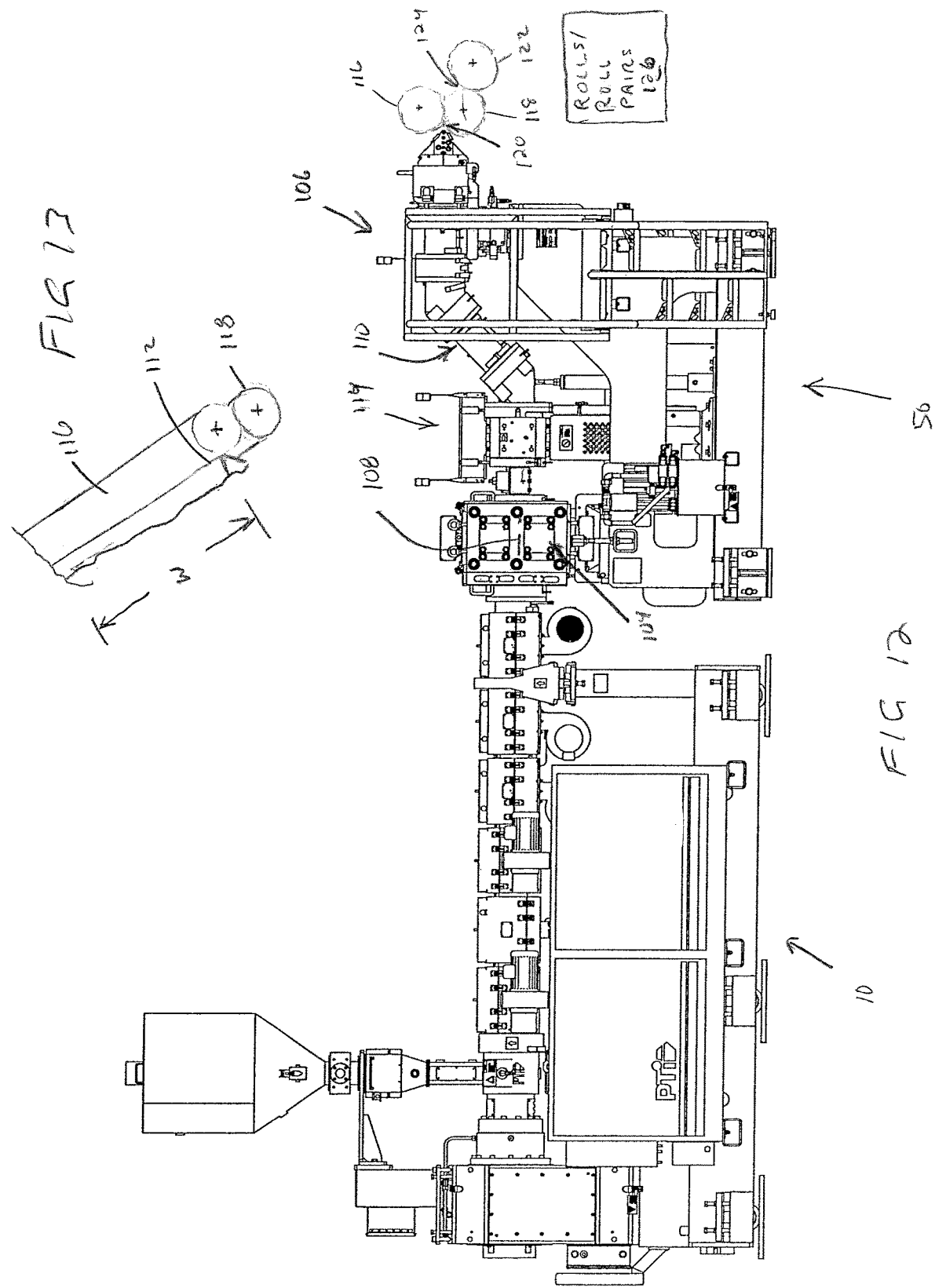

EXTRUDER ASSEMBLY AND METHOD OF EXTRUDING A MELTABLE MATERIAL USING THE EXTRUDER ASSEMBLY

BACKGROUND OF THE INVENTION

Field of the Invention

This invention relates to extrusion equipment and, more particularly, to an extruder assembly having a material advancing component that is turned around an axis at a speed of at least 300 rpm.

Background Art

A multitude of extruder assemblies are currently in commercial use that plasticate or melt a working material utilizing at least one screw that is turned within a barrel passage. The working material is continuously fed to the screws) and heated, both by independent heat sources and through the shearing action caused by the feed screw, to generate an extrudate that is processed in potentially many different manners through post-extrusion equipment.

The primary objective of designers of this type of extruder assembly is to afford a high density manufacturing capability. First of all, designers take into account that space is at a premium in most facilities. Thus, minimizing equipment footprint and volume is critical. At the same time, designers must focus on maximizing rate and volume of production of extrudate. These primary design objectives are generally competing, and thus a balance is often sought which may result in greater than desired space demands or a less than optimal production capacity.

Commonly, extruder assemblies are constructed so that the advancing screws are turned at low speeds—generally under 200 rpm. This can be accomplished using conventional drive motors that have a relatively small profile/volume which permits a construction wherein the motor may be placed under, and in lengthwise coincidence with, the barrel defining the passage within which the material advancing screw operates. The system component dimensions are such that there is an adequate airgap around the motor whereby the motor is not prone to overheating as a result of the heat generated through its own operation combined with heat generated by one or more heaters used to raise the temperature of the working material to a melting point in the vicinity of the motor as it advances through the barrel passage. Power from the motor is transmitted through a gearbox to the extruder screw. The gearbox is commonly situated at the upstream end of the extruder assembly. This overall arrangement of components affords a relatively compact footprint and volume, but is limited by the low speed turning of the extruder screw.

Production capacity for an extruder assembly is increased significantly by increasing the rotational speed of the extrusion screw. This high speed design necessitates a larger horsepower motor which occupies a greater volume than the low speed counterparts. Since the input/output gear ratio may be relatively small to provide the necessary torque to the extruder screw, conventional motors used for this application are generally quite large, including in their radial dimension with respect to the motor operating axis.

Since these large motors operating at high speed also generate more heat, it is critical that they have an adequate surrounding air volume that allows for heat dissipation. This problem is aggravated at one conventional motor location which is directly exposed to heaters for the working material that are placed potentially in multiple locations along the barrel length.

The above configurational problems are further aggravated by the fact that the extruder assembly "center line", defined by the extruder screw axis, is desirably kept within a certain range so as to both limit the vertical dimension of the extruder assembly and match its operating center line/axis with downstream extrudate processing equipment.

Faced with the above challenges, the manufacturers of extruder assemblies with extruder screws operating in the high speed range—300 or more rpm—have placed the motors upstream of the gearbox, thereby extending the overall length of the footprint for the extruder assembly. This avoids overheating contributed to by the heat generated by the material heating components in the vicinity of the location where material is delivered to the barrel inlet.

Aside from undesirably enlarging the equipment footprint, location of the motor at the upstream end of the extruder assembly also creates a distribution of mass that may lead to component instability and vibration during operation. The separation of large masses in these assemblies creates long moment arms. A concentration of the large masses at the upstream end of the extruder assembly may make it more difficult to stabilize the downstream region of the extruder assembly. This may lead to vibration that is undesirable in itself and may also lead to misalignment, wear, and eventually in a worst case, to parts failure.

The industry continues to seek equipment designs that have acceptable footprints/volumes and that are stable while having a production capacity that maximizes customer profitability.

SUMMARY OF THE INVENTION

In one form, the invention is directed to an extruder assembly including: a frame having an upstream end and a downstream end; a barrel assembly on the frame having a length and a passage with an inlet and an outlet; at least one material advancing component residing at least partially in the barrel assembly passage and configured to be turned around an operating axis to thereby cause material to be conveyed from the barrel assembly passage inlet to the barrel assembly passage outlet; and a drive assembly for turning the at least one material advancing component around the operating axis. The drive assembly has a motor on the frame situated so that at least a part of the motor is in lengthwise overlapping relationship with the barrel assembly. The drive assembly is configured to turn the at least one material advancing component around its operating axis at a speed of at least 300 rpm.

In one form, the extruder assembly has upstream and downstream ends and laterally spaced sides. The motor is situated so that at least a part of the motor resides directly beneath the operating axis of the one material advancing component.

In one form, the motor is situated so that at least a part of the motor is in vertically overlapping relationship with the barrel assembly.

In one form, the motor has an operating axis. The operating axes for the motor and one material advancing component are substantially parallel and vertically aligned.

In one form, the extruder assembly further includes a hopper assembly with a storage volume into which a supply of material to be processed can be placed. The hopper assembly is configured to deliver material from the storage volume to the barrel assembly passage inlet at a first delivery location.

In one form, the first delivery location is directly over a part of the motor.

In one form, the extruder assembly further includes a first heater assembly that is configured to heat material within the barrel assembly passage downstream of the first delivery location.

In one form, the extruder assembly further includes a first heater assembly that is configured to heat material within the barrel assembly passage. The first heater assembly is directly vertically over a part of the motor.

In one form, the drive assembly further includes a gear box assembly which is configured to transmit a drive force between the motor and the at least one material advancing component. The gear box assembly has an input component driven by the motor around a first axis and an output component that moves around a second axis and is connected to drive the at least one material advancing component. The first and second axes are vertically spaced from each other.

In one form, at least a part of the gear box assembly is located upstream of the motor.

In one form, the gear box assembly has a housing. The extruder assembly further includes a hopper assembly with a storage volume into which a supply of material to be processed can be placed. The hopper assembly is configured to deliver material from the storage volume to the barrel assembly passage inlet at a first delivery location. The extruder assembly further includes reinforcing structure acting between the gear box assembly housing and the hopper assembly above the barrel assembly.

In one form, the extruder assembly is provided in combination with a die assembly that is configured to direct material in flowable form across a width on a roll. A material delivery system is configured to direct flowable material from the barrel assembly passage outlet to the die assembly.

In one form, the extruder assembly is provided in further combination with first and second rolls defining a first nipping location between the first and second rolls. The die assembly and first and second rolls are configured so that flowable material directed towards the nipping location is formed into a sheet shape by the first and second rolls.

In one form, the extruder assembly is provided in further combination with a third roll that is configured to cooperate with the second roll to define a second nipping location between the second and third rolls. The second and third rolls cooperate to cause further treatment of a sheet shape advanced through the first nipping location.

In one form, the frame has a footprint circumscribed by a rectangle with laterally spaced sides and upstream and downstream ends. The motor has an operating axis that is substantially centered between the laterally spaced sides of the footprint.

In one form, the operating axis of the one material advancing component is substantially centered between the laterally spaced sides of the footprint.

In one form, the invention further includes a temperature control assembly configured to interact with the motor to limit heat generation by the motor.

In one form, the temperature control assembly has a blower configured to direct ambient air against the motor.

In one form, the motor is a high density motor.

In one form, the extruder assembly is configured to be placed in an operative position on a support surface. The operating axis for the at least one material advancing component is spaced in the range of 30-72 inches from the support surface with the extruder assembly in its operative position.

In one form, the invention is directed to a method of extruding a meltable material. The method includes the steps of: obtaining an extruder assembly as described above; placing a material in the storage volume; delivering the material from the storage volume into the barrel passage; heating the material in the barrel assembly passage; and operating the drive assembly to turn the at least one material advancing component around its operating axis at a speed of at least 300 rpm to thereby advance the material in the barrel assembly passage to the barrel assembly passage outlet.

Other objects, features, and advantages of the invention will become apparent from a review of the entire specification, including the appended claims and drawings.

BRIEF DESCRIPTION OF THE DRAWINGS

FIG. 3 is a side elevation view of one exemplary form of the inventive extruder assembly;

FIG. 4 is an exploded, side elevation view of the extruder assembly of FIG. 3;

FIG. 5 is a plan view of a drive subassembly on the extruder assembly taken along line 5-5 of FIG. 3;

FIG. 10 is a schematic representation of a footprint for the extruder assembly in FIGS. 3-9;

FIG. 12 is a view of the extruder assembly corresponding to that in FIGS. 3-9, and with one exemplary form of the post-extrusion processing equipment downstream therefrom and including a die assembly from which flowable working material is discharged; and FIG. 13 is a fragmentary, perspective view showing the die assembly discharge at a nipping location between cooperating rolls.

DETAILED DESCRIPTION OF THE PREFERRED EMBODIMENT

Figure 1:
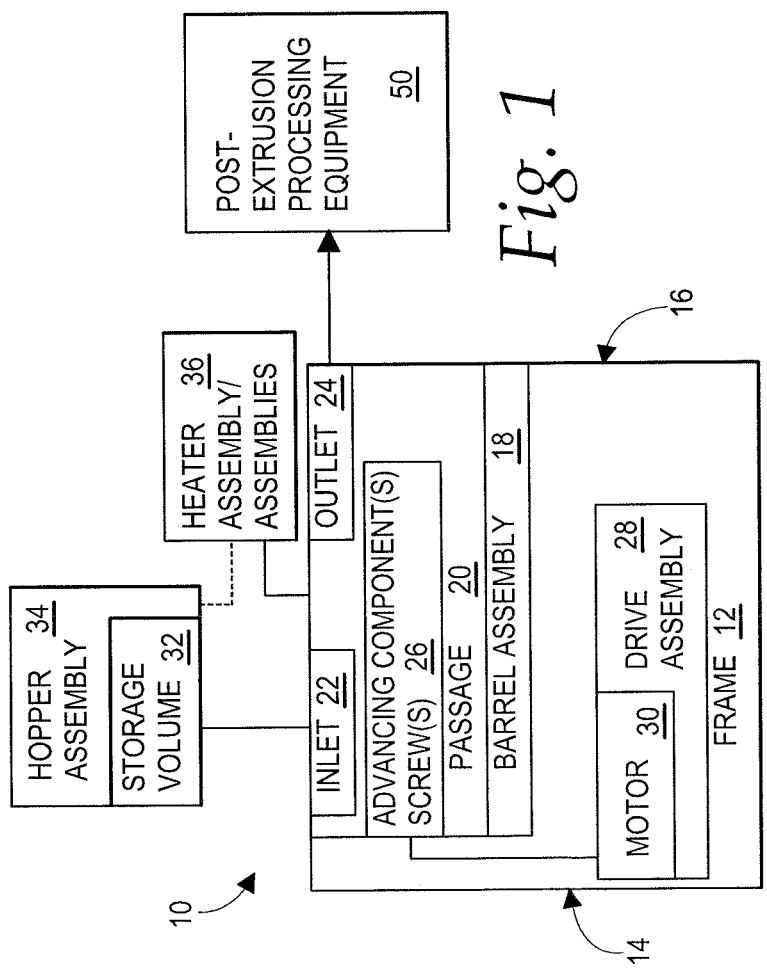
FIG. 1 is a schematic representation of an extruder assembly, according to the present invention, usable with different post-extrusion processing equipment.

In FIG. 1, an extruder assembly, according to the present invention, is shown generically at 10. The extruder assembly 10 has a frame 12 with an upstream end 14 and a downstream end 16. A barrel assembly 18 is provided on the frame 12 and has a passage 20 with an inlet 22 and an outlet 24. At least one material advancing component 26 resides at least partially within the passage 20 and is operated to convey material to be processed from the barrel passage inlet 22 to its outlet 24. Typically, the advancing component(s) 26 may be one or more conventionally formed extruder screws. Regardless of its configuration, the advancing component(s)/screw(s) 26 functions by being turned around an operating axis.

A drive assembly 28 turns the at least one material advancing component/screw 26 around its operating axis. The drive assembly 28 has a motor 30 on the frame 12 situated so that at least a part of the motor is in lengthwise overlapping relationship with the barrel assembly 18.

The drive assembly 28 is configured to turn the at least one material advancing component 26 around its operating axis at a speed of at least 300 rpm.

A working material is placed in a storage volume 32 on a hopper assembly 34 that is configured to deliver material from the storage volume 32 to the barrel assembly inlet 22 at a first delivery location. While there is no limitation on the type of material used, propylene and styrene are commonly used.

At least one heater assembly 36 is provided to heat material within the barrel assembly passage 20. This may occur at or downstream of the first location where the material is delivered to the passage inlet 22. Heating of the material at the hopper assembly 34 may also occur.

The extruder assembly 10 is shown in schematic form in FIG. 1 to encompass a wide range of configurations of the various components shown therein and their interaction. The generic showing is intended to encompass the specific exemplary forms, as described hereinbelow, as well as virtually an unlimited number of variations of those components and their interaction, as would be obvious to one skilled in this art with the teachings herein in hand.

Figure 2:
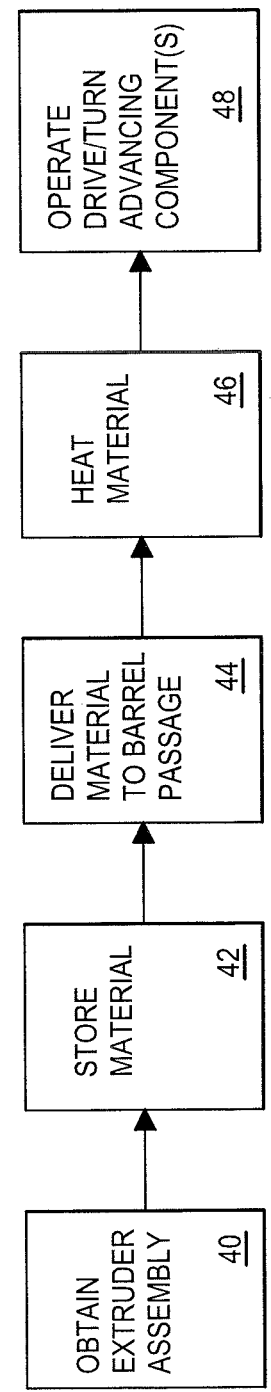
FIG. 2 is a flow diagram representation of a method of extruding a meltable material using the extruder assembly in FIG. 1.
Figure 6:
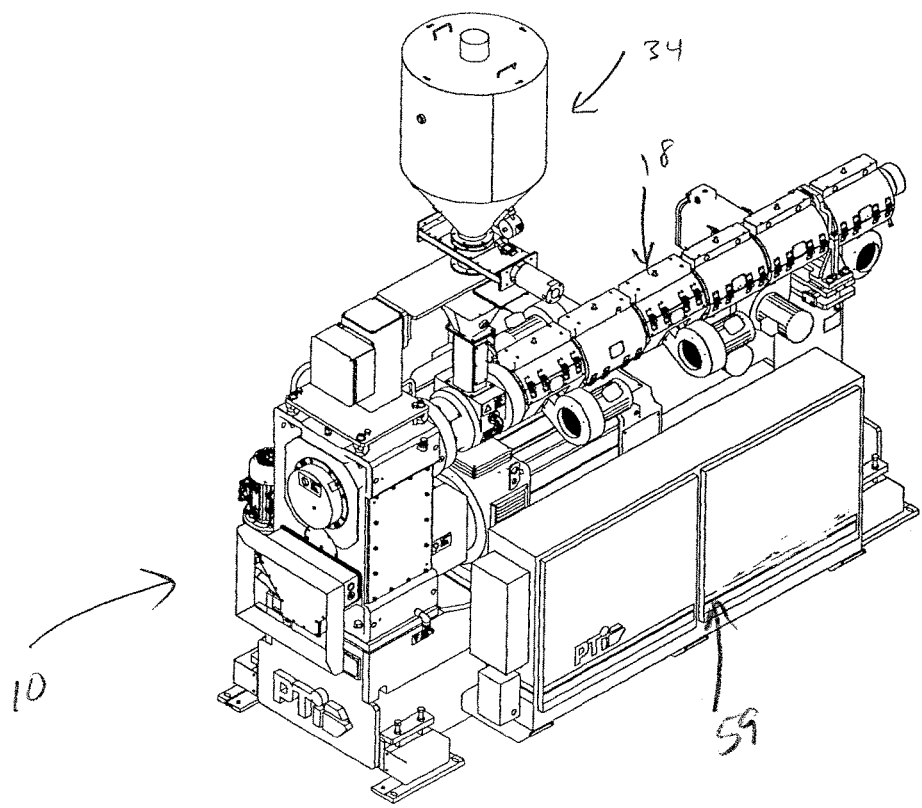
FIG. 6 is a rear perspective view of the extruder assembly in FIGS. 3-5.
Figure 7:
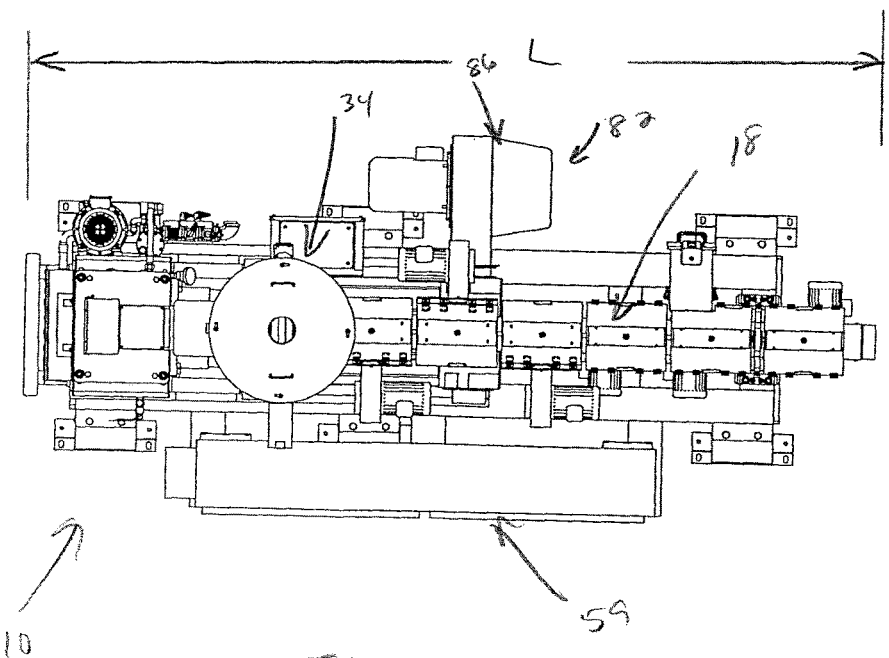
FIG. 7 is a plan view of the extruder assembly in FIGS. 3-6.
Figure 8:
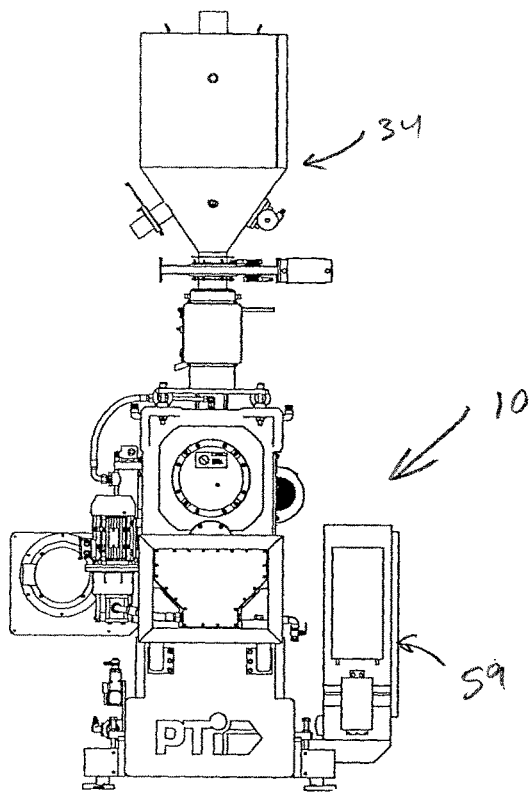
FIG. 8 is a rear elevation view of the extruder assembly in FIGS. 3-7.

With the structure as shown in FIG. 1, a method of extruding a meltable material can be carried out as shown in flow diagram form in FIG. 2.

As shown at block 40, an extruder assembly as shown in FIG. 1 is obtained.

As shown at block 42, a meltable material is placed in the storage volume 32 in the hopper assembly 34.

As shown at block 44, the material from the storage volume 32 is delivered into the barrel passage 20.

As shown at block 46, the working material is heated at least in the barrel assembly passage 18.

As shown at block 48, the drive assembly 28 is operated to turn the at least one material advancing component 26 around its operating axis at a speed of at least 300 rpm to thereby advance the material in the barrel assembly passage 20 to the outlet 24.

As shown in FIG. 1, the extrudate discharged from the outlet 24 can be delivered to post-extrusion processing equipment, shown generally at 50. The post-extrusion processing equipment 50 may be any number, type, or combination of conventionally used processing assemblies. A specific exemplary form of post-extrusion processing equipment 50, to which the extruder assembly 10 is particularly adapted, will be described hereinbelow.

Referring now to FIGS. 3-13, one specific form of the extruder assembly 10, as shown in FIG. 1, is depicted. As noted above, this specific form is only exemplary in nature.

The frame 12 on the extruder assembly 10, which is preferably fabricated using steel, supports the barrel assembly 18, the drive assembly 28, the hopper assembly 34, and the remaining extrusion assembly components, to produce a shape with a generally rectangular footprint with a length L and width W, viewed in plan as shown schematically in FIG. 10. This footprint is shown to be circumscribed by a rectangle with laterally spaced sides 52, 54 and upstream and downstream ends 56, 58, respectively.

A control box/panel 59 is also mounted to the frame 12.

The hopper assembly 34 is supported indirectly on the frame 12 by a feed section 60 that connects to a housing 62 on a gearbox/gearbox assembly 64 that makes up part of the drive assembly 28.

The barrel assembly 18 is connected to the feed section 60 and supports a plurality of heater assemblies 36a-36f serially arranged between the inlet 22 and outlet 24 of the barrel assembly passage 20. Cool to the touch heater designs permit open access to the heater assemblies 36 without the need for thermal guards, thereby contributing to the formation of a larger air gap around the motor in the depicted mounting arrangement.

Figure 11:
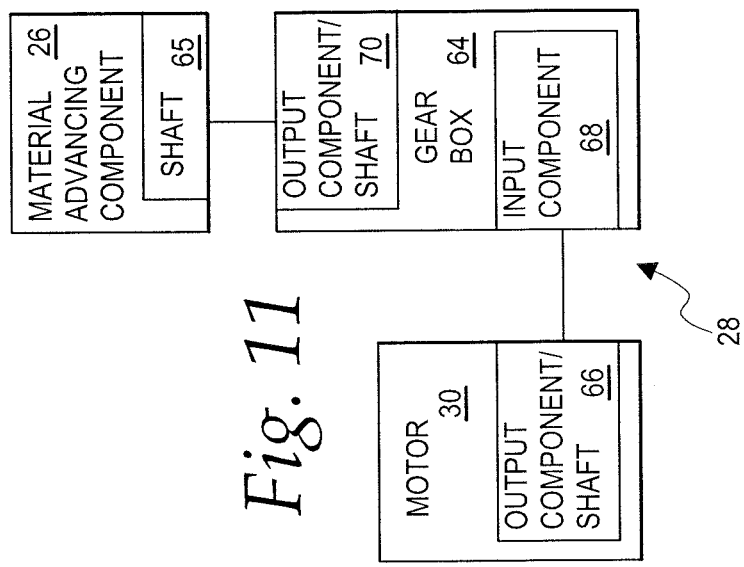
FIG. 11 is a schematic representation of a drive assembly on the inventive extruder assembly.

As shown schematically in FIG. 11, the drive assembly 28 is configured to turn a shaft 65 associated with each material advancing component 26 at or above 300 rpm.

The motor 30, that is part of the drive assembly 28, has an output component/shaft 66 which drives an input component 68 on the gearbox 64. Through a gear arrangement in the gearbox 64, torque on the input component 68 is transferred to an output component/shaft 70 which is connected to the shaft 65 on the material advancing component 26 to effect turning thereof. Motors suitable for this high speed application generally range from 150-600+ hp. A speed range for this motor is typically 0-1500 rpm (which performs at constant torque, 0-100% of available torque as per the motor rating, throughout the speed range) with an upper "over speed" range of 2400 rpm (which performs at constant power in lieu of constant torque; above base speed the available torque drops off as speed increases in order to accommodate the higher speed range). A typical gear reduction ratio may be on the order of 2:1. Gear ratios may range from 1.5-4+:1.

In the depicted embodiment, the material advancing component 26 has a conventional screw form with an operating axis 74 that is concentric with the central axis 76 of the barrel passage 20 within which it extends and operates.

In this embodiment, the gearbox housing 62 is supported at the upstream end 14 of the frame 10. The feed section 60 is connected to the gearbox housing 62 and connects in turn to the barrel assembly 18, which projects in cantilever fashion away from the gearbox housing 62 in a downstream direction.

A downstream region of the barrel assembly 18 is stabilized by an upwardly projecting support 78 on the frame 12 that engages a linear bearing assembly 80 on the barrel assembly 18. The linear bearing support permits unrestricted linear expansion, which is important at elevated speed ranges.

The motor 30 is part of a drive subassembly, shown at 82 in FIG. 5, that includes a subframe 84 that supports the motor 30, a temperature control assembly 86 for the motor 30, and an electrical terminal box 88 for the motor 30. The temperature control assembly 86 may include, for example, a blower unit that is a primary cooler or one that supplements a cooling mechanism, such as one including a blower, on the motor 30.

The drive subassembly 82 is mounted in a space at 90 beneath the barrel assembly 18, which for purposes of simplicity will be considered to include the feed section 60. The drive subassembly 82 is supported on laterally spaced pads 92 on the frame 12 such that the axis 94 of the motor shaft 66 is at a height to engage the input component 68 on the gear box 64. The pads 92 create a space/air gap G beneath the subassembly 82 that allows heat generated by the motor 30 to dissipate, which is aided by air flow permitted in both lengthwise and lateral directions against and past the motor 30.

In a preferred form, the motor 30 is situated so that at least a part thereof resides directly beneath the operating axis 74 for the material advancing component 26. With this arrangement, at least part of the motor 30 is in laterally overlapping relationship with the barrel assembly 18 so as to afford a laterally compact configuration.

As depicted, the axes 94, 74 are substantially parallel and in vertical alignment.

Figure 9:
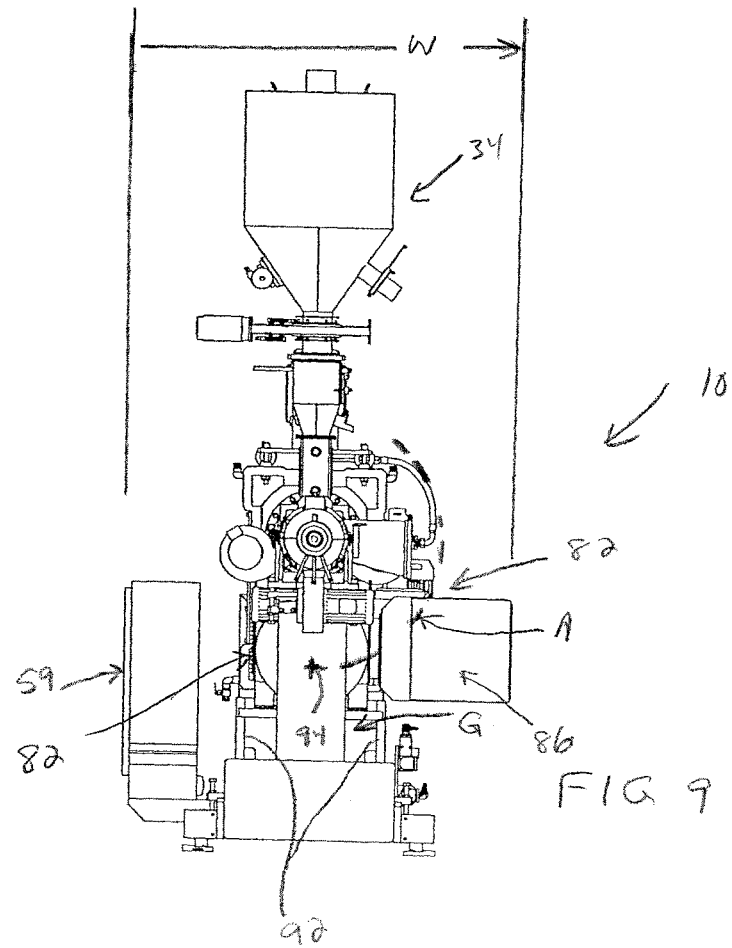
FIG. 9 is a front elevation view of the extruder assembly in FIGS. 3-8.

The motor 30 might alternatively be situated so that the motor axis 94 is not in direct vertically aligned relationship with the operating axis 74. As seen in FIG. 9, the motor 30 might be located so that its axis 94 is anywhere along an arc identified by a dotted line at A. The motor 30 could be offset to either side of the operating axis 74. Further, the arc A shows potential different motor axis locations with the same spacing between the axes 74, 94. This spacing could be changed to select an optimal overall configuration based upon the configuration of the assembly components and surrounding environment. As but one example, the motor axis 94 might be offset on the order of 20" to a side of the axis 74. The motor 30 may be situated in this optional design to be either fully beneath the barrel assembly 18 or in vertically overlapping relationship therewith.

As further depicted, the output component/shaft 70 on the gearbox 64 is coincident with the axis 74.

The vertical spacing of the axes 94 and 74, 96 is preferably on the order of twenty inches. This is an optimal spacing for the particular design offered by the assignee herein. This spacing may be significantly more or less depending upon the particular system configuration and its overall operating axis/line preferably to be common to all upstream and downstream components.

At least part of the gearbox assembly 64 is preferably located upstream of the motor 30. As depicted, substantially the entire gearbox assembly 64 resides upstream of the motor 30.

As depicted, the operating axis 94 for the motor 30 is substantially centered between the sides 52, 54 of the extruder assembly and its rectangular footprint as shown in FIG. 10. The operating axis 74 for the material advancing component 26 may be similarly centered.

As another design feature that contributes to making possible the placement of the motor 30 within the limited dimensions of the space 90 in a manner that it will not overheat, the motor 30 is preferably made with a high density, high efficiency construction. This gives a high power-to-volume ratio.

Additionally, the temperature control assembly 86 limits heat generation by forcing ambient air against the motor 30. This is aided by the strategic support configuration for the drive subassembly 82 that creates clearance around the motor 30 within a tight volume to dissipate heat and allow cooling air flow.

Use of high efficiency heater assemblies 36 also makes possible the inventive construction.

In one preferred form, with the extruder assembly 10 in an operative position on a support surface 98, a distance X from the support surface 98 to the operating axis 74 for the material advancing component 26 is in the range of 30-72 inches.

A distance X1 between the bottom of the drive subassembly 82 and the operating axis 74 is preferably at least 30 inches.

The dimension X2 represents the spacing between the axes 94, 96 and, in one preferred form, is on the order of 20 inches. X2 could be significantly larger or smaller than 20 inches.

The dimension X4 is the vertical dimension of the subframe assembly 84, which in one form is generally equal to, or slightly greater than, the diameter of the motor 30. The motor diameter may be on the order of 20 inches.

In this embodiment, the aforementioned material delivery location at 100, where the working material is delivered to the inlet 22 on the barrel assembly passage 20, is directly over a part of the motor 30.

Similarly, the heater assembly 36a is directly vertically over a part of the motor 30.

As seen in FIG. 3, a reinforcing structure is provided at 102 acting between the gearbox assembly housing 62 and the hopper assembly 34 to effect stabilization of the hopper assembly 34.

The lengthwise overlap of the motor 30 and barrel assembly 18 provides a compact configuration, particularly in a lengthwise direction. The close concentration of the large masses of the frame 12, gear box assembly 64, and motor 30 allows for a highly stable/stiff construction that is not prone to vibrating appreciably in operation compared to prior designs in which long moment arms may amplify vibrations. The high speed operation with a small footprint permits high efficiency performance.

The basic construction can be used for: a) primary extruders arranged for a mono-layer process; and b) co-extruders combined with primary extruders to make a multi-layer sheet structure.

FIGS. 12 and 13 show one exemplary arrangement of post-extrusion processing equipment at 50. In this exemplary embodiment, the equipment 50 downstream of the extruder assembly 10 consists of a material filter 104 and a die assembly 106 integrated with the filter 104 to define a module having an operating center line 108 alignable with the axes 74, 76, 96.

In this embodiment, the die assembly receives extrudate from the filter 104 through a gooseneck-shaped conduit 110. The die assembly 106 discharges the extrudate at an outlet 112 which has an elongate, slot shape so that the extrudate is delivered over a width W.

The details of the material delivery system 114, that directs flowable material from the barrel assembly passage outlet 24 to the die assembly 106, are not critical, as many different structures for accomplishing this end are currently commercially available.

In this embodiment, the die assembly outlet 112 is arranged to discharge flowable material against rolls 116, 118 that cooperatively define a first nipping location 120. The first and second rolls 116, 118 cooperate to form the flowable material discharged by the die assembly 106 into a sheet shape.

A third roll 122 cooperates with the roll 118 to define a second nipping location 124 between the rolls 118, 122. The sheet passing between the rolls 118, 122 is further treated/processed.

Additional rolls/roll pairs, shown generically at 126, may be provided downstream of the roll 122.

As noted above, the depicted extrusion processing equipment 50 is exemplary in nature only as to the many different types of equipment that might be utilized in conjunction with the extrusion assembly 10.

The foregoing disclosure of specific embodiments is intended to be illustrative of the broad concepts comprehended by the invention.

The invention claimed is:

1. A method of extruding a meltable material, the method comprising the steps of:
   (a) obtaining an extruder assembly comprising:
      a frame having an upstream end and a downstream end;
      a barrel assembly on the frame having a length and a passage with an inlet and an outlet,
      at least one material advancing component residing at least partially in the barrel assembly passage and configured to be turned around an operating axis to thereby cause material to be conveyed from the barrel assembly passage inlet to the barrel assembly passage outlet; and
      a drive assembly for turning the at least one material advancing component around the operating axis,
      the drive assembly comprising a motor on the frame situated so that at least a part of the motor is in lengthwise overlapping relationship with the barrel assembly,
      wherein the motor has a shaft with an axis that is substantially parallel to, and spaced from, the operating axis for the at least one materiel advancing component,
      wherein the drive assembly is configured to turn the at least one material advancing component around its operating axis at a speed of at least 300 rpm,
      wherein the extruder assembly further comprises a hopper assembly with a storage volume into which a supply of material to be processed can be placed, the hopper assembly configured to delivery material from the storage volume to the barrel assembly passage inlet at a first delivery location;
   (b) placing a material in the storage volume;
   (c) delivering the material from the storage volume into the barrel passage;
   (d) heating the material in the barrel assembly passage; and
   (e) operating the drive assembly to turn the at least one material advancing component around its operating axis at a speed of at least 300 rpm to thereby advance the material in the barrel assembly passage to the barrel assembly passage outlet.

2. The method of extruding a meltable material according to claim 1 wherein the extruder assembly has upstream and downstream ends and laterally spaced sides and the motor is situated so that at least a part of the motor resides directly beneath the operating axis of the one material advancing component.

3. The method of extruding a meltable material according to claim 2 wherein the motor is situated so that at least a part of the motor is in vertically overlapping relationship with the barrel assembly.

4. The method of extruding a meltable material according to claim 1 wherein the motor shaft axis and the operating axis for the one material advancing component are substantially vertically aligned.

5. The method of extruding a meltable material according to claim 1 wherein the first delivery location is directly over a part of the motor.

6. The method of extruding a meltable material according to claim 5 wherein the extruder assembly further comprises a first heater assembly that is configured to heat material within the barrel assembly passage downstream of the first delivery location.

7. The method of extruding a meltable material according to claim 1 wherein the extruder assembly further comprises a first heater assembly that is configured to heat material within the barrel assembly passage and the first heater assembly is directly vertically over a part of the motor.

8. The method of extruding a meltable material according to claim 1 wherein the drive assembly further comprises a gear box assembly which is configured to transmit a drive force between the motor and the at least one material advancing component, the gear box assembly comprising an input component driven by the motor around a first axis and an output component that moves around a second axis and is connected to drive the at least one material advancing component, wherein the first and second axes are vertically spaced from each other.

9. The method of extruding a meltable material according to claim 8 wherein at least a part of the gear box assembly is located upstream of the motor.

10. The method of extruding a meltable material according to claim 8 wherein the gear box assembly comprises a housing, the extruder assembly further comprising a hopper assembly with a storage volume into which a supply of material to be processed can be placed, the hopper assembly configured to deliver material from the storage volume to the barrel assembly passage inlet at a first delivery location and the extruder assembly further comprises reinforcing structure acting between the gear box assembly housing and the hopper assembly above the barrel assembly.

11. The method of extruding a meltable material according to claim 1 further comprising the steps of obtaining a die assembly, causing the die assembly to direct material in flowable form across a width on a roll, obtaining a material delivery system, and causing the material delivery system to direct meltable material from the barrel assembly passage outlet to the die assembly.

12. The method of extruding a meltable material according to claim 11 further comprising the steps of obtaining first and second rolls defining a first nipping location between the first and second rolls and causing meltable material directed towards the nipping location to be formed into a sheet shape by the first and second rolls.

13. The method of extruding a meltable material according to claim 12 further comprising the steps of obtaining a third roll that is configured to cooperate with the second roll to define a second nipping location between the second and third rolls and causing the second and third rolls to cooperate to cause further treatment of a sheet shape advanced through the first nipping location.

14. The method of extruding a meltable material according to claim 1 wherein the frame has a footprint circumscribed by a rectangle with laterally spaced sides and upstream and downstream ends, wherein the motor has an operating axis that is substantially centered between the laterally spaced sides of the footprint.

15. The method of extruding a meltable material according to claim 14 wherein the operating axis of the one material advancing component is substantially centered between the laterally spaced sides of the footprint.

16. The method of extruding a meltable material according to claim 1 further comprising the steps of obtaining a temperature control assembly and causing the temperature control assembly to interact with the motor to limit heat generation by the motor.

17. The method of extruding a meltable material according to claim 16 wherein the temperature control assembly comprises a blower configured to direct ambient air against the motor.

18. The method of extruding a meltable material according to claim 1 wherein the motor is a high density motor.

19. The method of extruding a meltable material according to claim 1 wherein the extruder assembly is configured to be placed in an operative position on a support surface and the operating axis for the at least one material advancing component is spaced in the range of 30-72 inches from the support surface with the extruder assembly in its operative position.

\* \* \* \* \*